July 11, 1961 V. K. ELORANTA 2,991,702
PHOTOGRAPHIC APPARATUS
Filed July 16, 1958 9 Sheets-Sheet 1
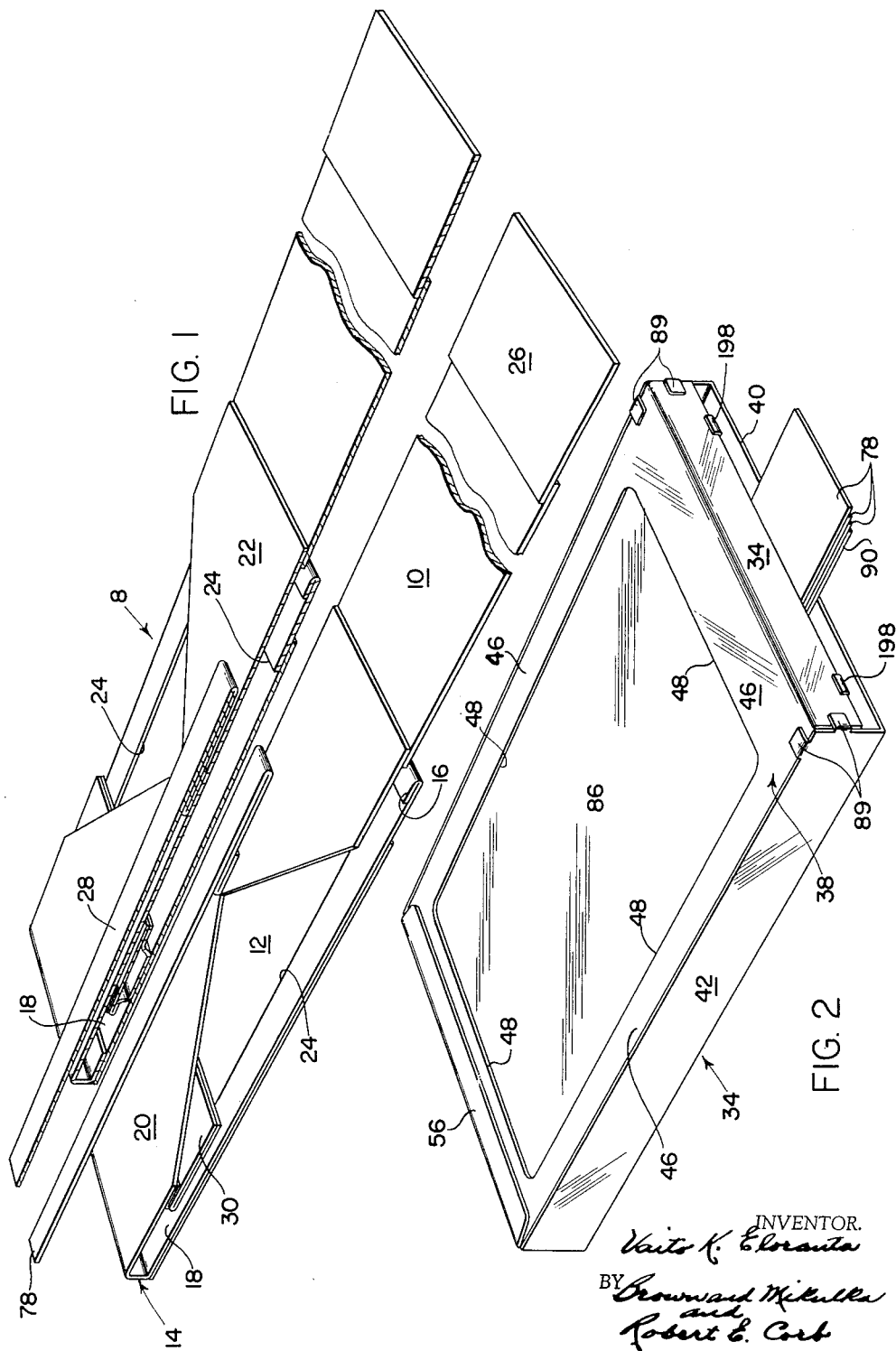
INVENTOR.
Vaito K. Eloranta
BY Brownward Mikulka
and
Robert E. Corb
ATTORNEYS July 11, 1961

V. K. ELORANTA 2,991,702

PHOTOGRAPHIC APPARATUS

Filed July 16, 1958

INVENTOR.
Vaito K. Eloranta
BY Brown and Mikulka
and
Robert E. Corb
ATTORNEYS

July 11, 1961  V. K. ELORANTA  2,991,702
PHOTOGRAPHIC APPARATUS

Filed July 16, 1958  9 Sheets-Sheet 3

INVENTOR.
Vaito K. Eloranta
BY Brown and Mikulka
and Robert E. Corb
ATTORNEYS

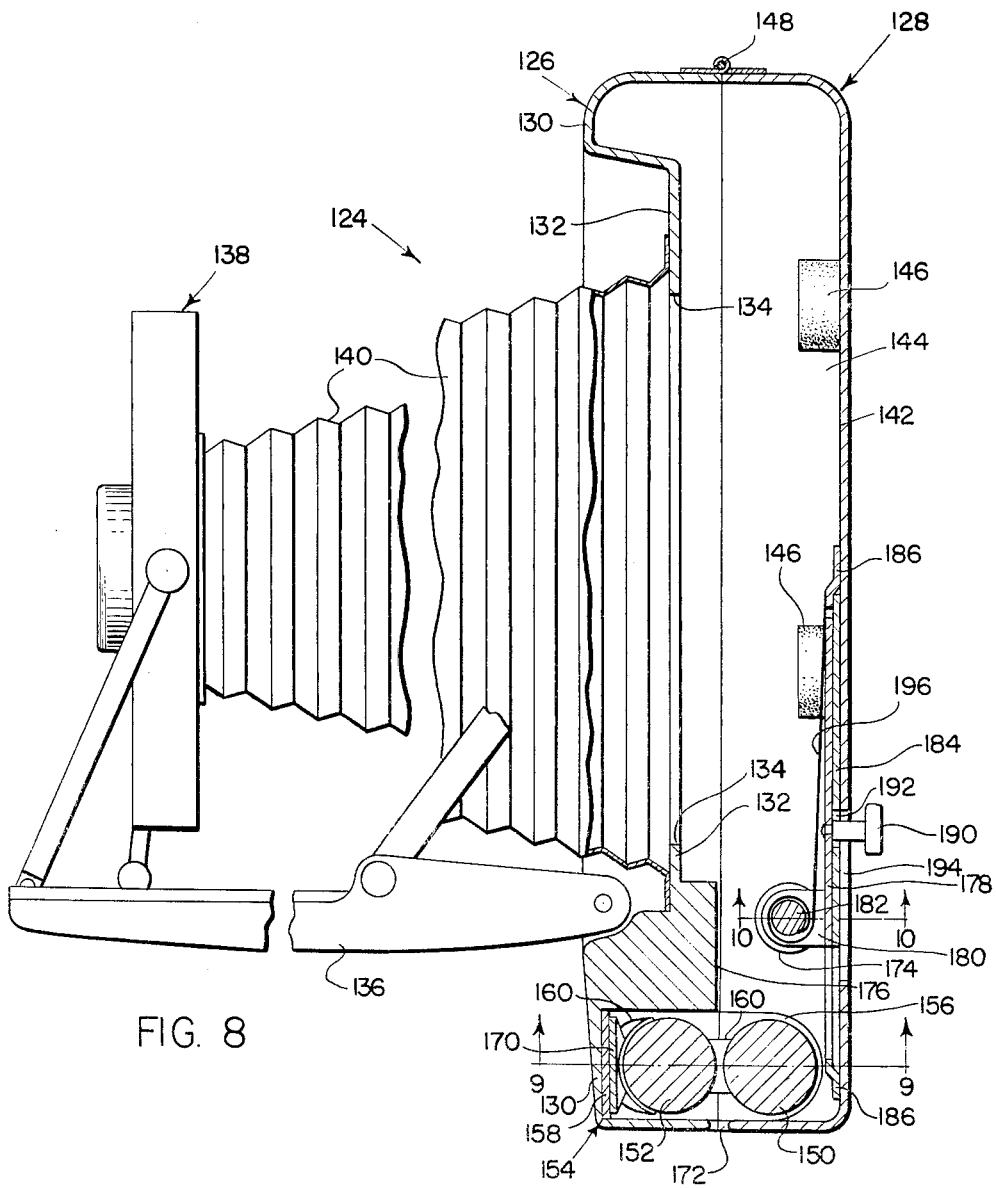

July 11, 1961 V. K. ELORANTA 2,991,702
PHOTOGRAPHIC APPARATUS
Filed July 16, 1958 9 Sheets-Sheet 5
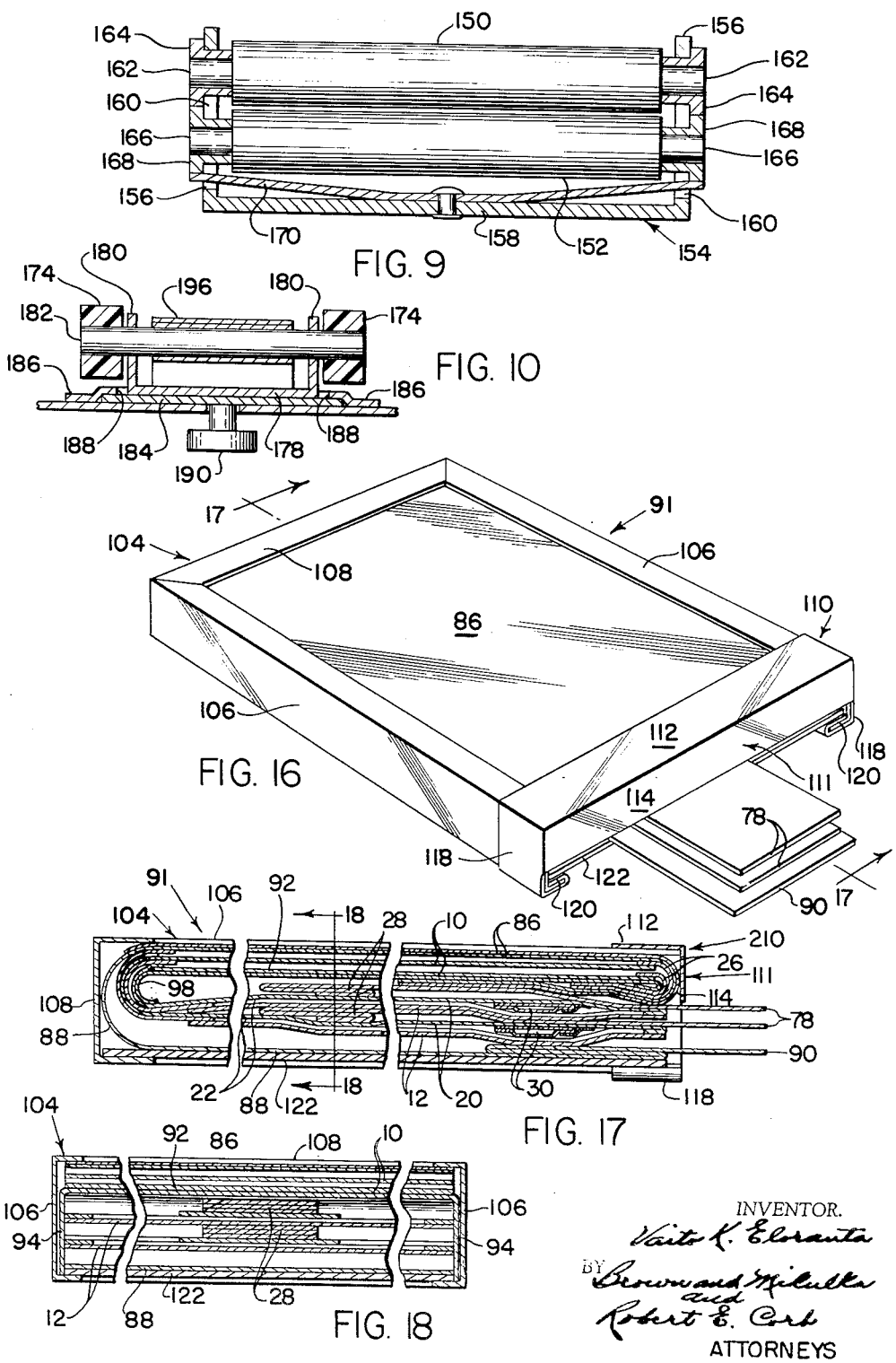
INVENTOR.
Vaito K. Eloranta
ATTORNEYS

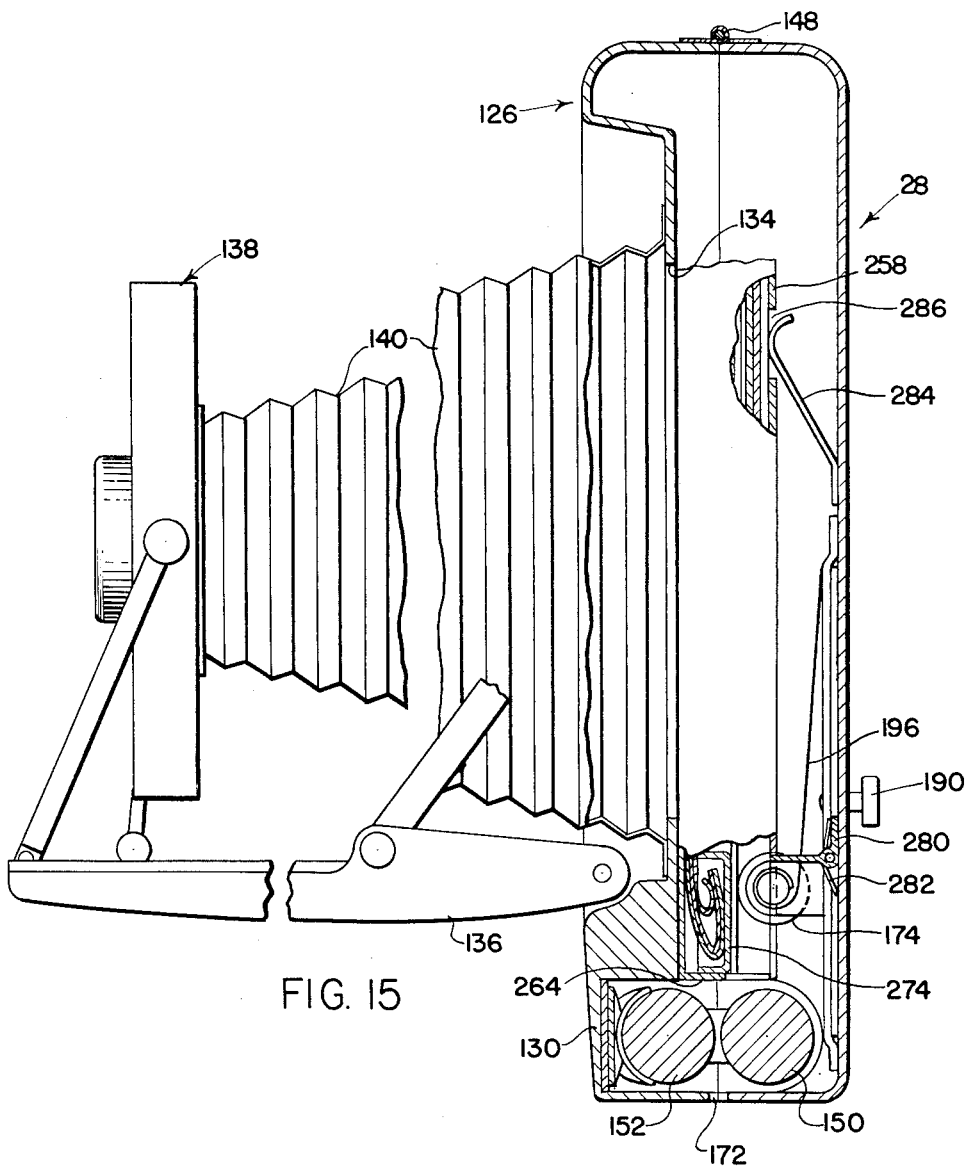

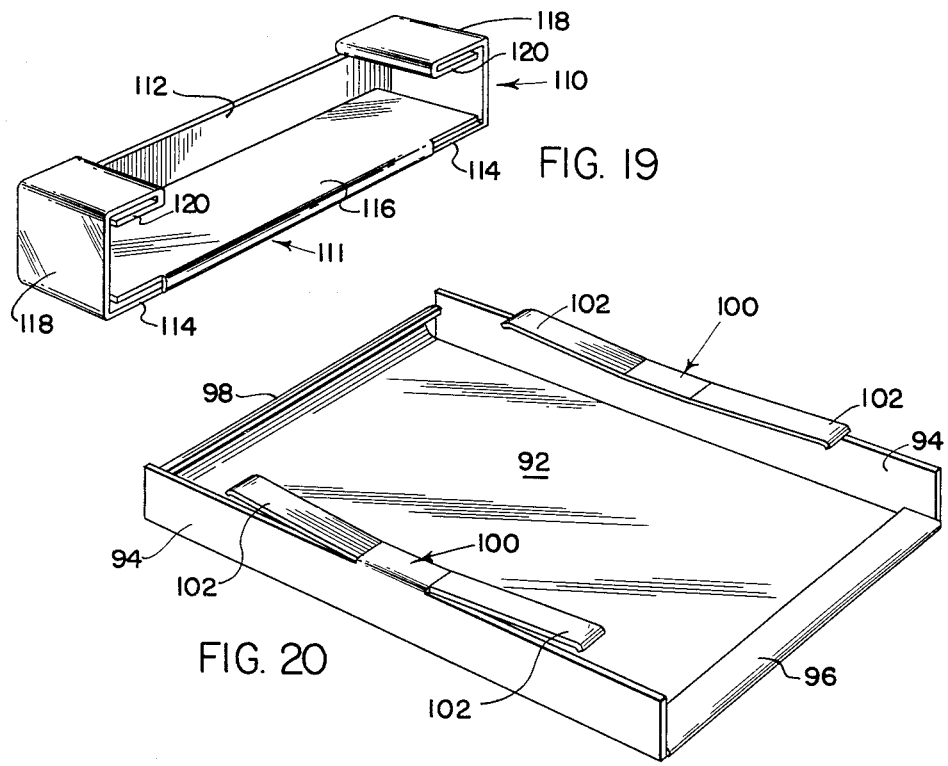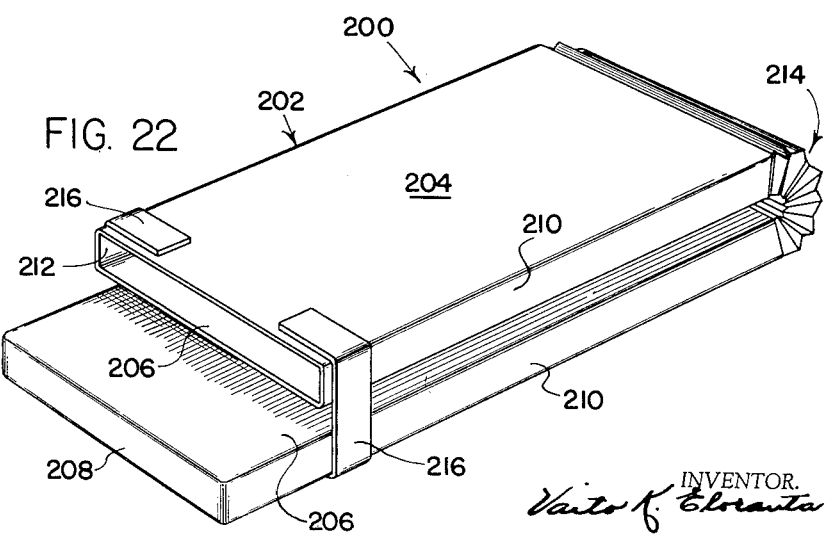

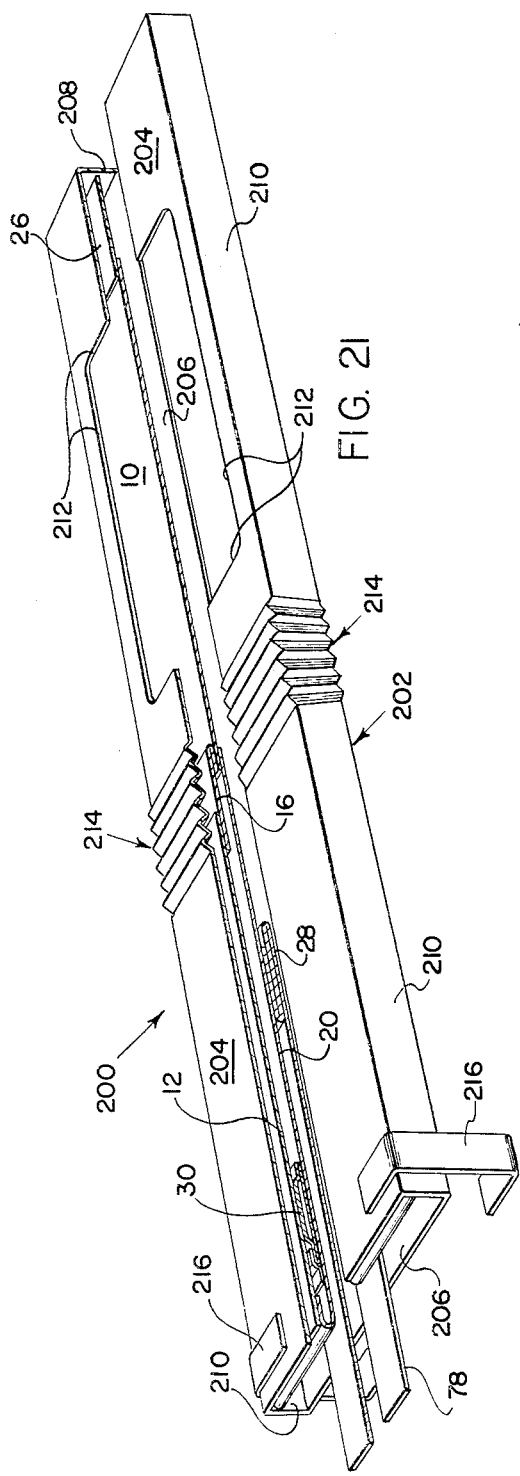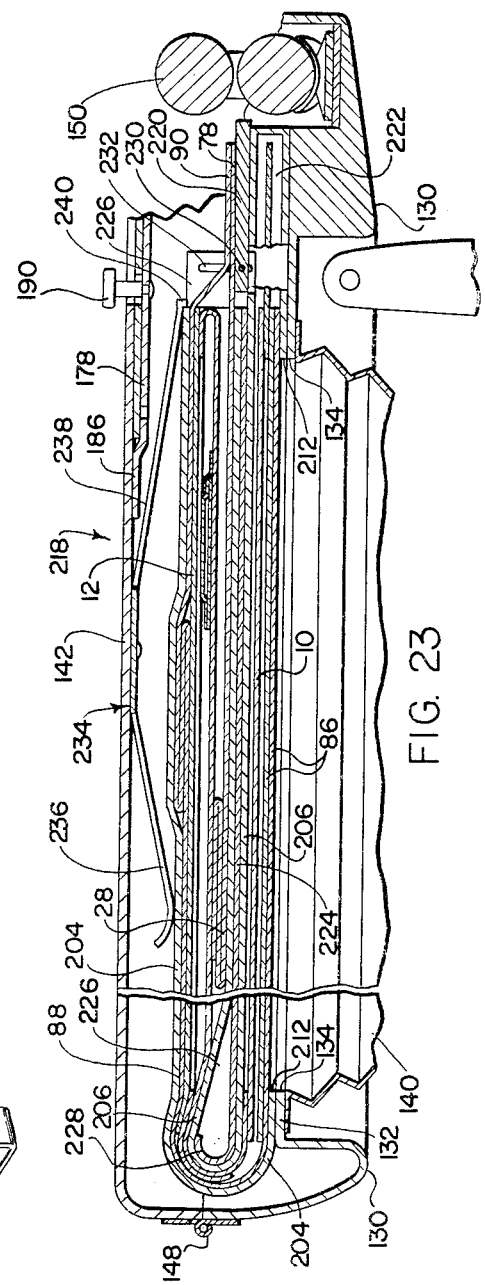

United States Patent Office 2,991,702
Patented July 11, 1961

2,991,702
PHOTOGRAPHIC APPARATUS
Vaito K. Eloranta, Needham, Mass., assignor to Polaroid Corporation, Cambridge, Mass., a corporation of Delaware
Filed July 16, 1958, Ser. No. 749,024
23 Claims. (Cl. 95—13)

This invention relates to novel photographic apparatus and, more particularly, to apparatus adapted to effect the exposure and processing of photosensitive sheet materials.

A variety of forms of photographic apparatus have been proposed wherein a photosensitive sheet is exposed and processed by a fluid composition distributed between the photosensitive sheet and another sheet superposed therewith. Whether in the form of a camera, or a film pack or film pack holder intended to be employed in conjunction with a camera or other exposure means, such apparatus generally includes means for holding a photosensitive sheet for exposure, means, such as a pair of pressure-applying members, for distributing a processing fluid between the photosensitive sheet and another sheet superposed therewith, and means for effecting the movement of the sheets between the pressure-applying members. Generally, apparatus of the type with which the present invention is concerned is intended to be employed with a plurality or assemblage of film units, each comprising a photosensitive sheet, a second sheet and a container of fluid processing composition. The photosensitive sheet is exposed and thereafter processed by being moved in superposition with the second sheet between a pair of pressure-applying members for distributing the fluid processing composition between the sheets. A preferred arrangement for superposing the sheets and moving them between the pressure-applying members has been to provide a leader or leaders attached to each film unit and projecting from the apparatus whereby they may be grasped for moving the sheets comprising the film units within the apparatus and for drawing the film units between the pressure-applying members.

Objects of the invention are: to provide novel photographic apparatus for exposing and processing photosensitive elements of film units, each comprising a photosensitive element, a second element and a leader coupled with said elements, said apparatus comprising means for containing a plurality of said film units with said leaders contained completely within said apparatus and means for advancing a portion of each of said leaders, one at a time and in proper sequence, from said apparatus; to provide apparatus of the type described comprising a pair of pressure-applying members between which said film units are adapted to be withdrawn directly from said apparatus and means for feeding said leaders, one at a time, from said apparatus between said pressure-applying members; to provide apparatus as described comprising manually engageable means movable through a predetermined distance for moving a leader attached to a film unit through a substantially greater distance between a pair of pressure-applying members from said apparatus; and to provide apparatus as described characterized by its compactness, simplicity and inexpensiveness of construction and its ease and dependability of operation.

Other objects of the invention are: to provide photographic apparatus of the type described including means for containing a plurality of photosensitive sheets arranged in stacked relation and in position for exposure, and a plurality of second sheets arranged in stacked relation apart from said photosensitive sheets and adapted to be superposed therewith, said means including a spacing element disposed between said photosensitive and second sheets and spring means for biasing said element so as to urge said photosensitive sheets into position for exposure; and to provide apparatus of the above type wherein said spring means includes means for engaging and retaining said second sheets within said apparatus during movement of another of said film units through and from said apparatus.

Other objects of the invention will in part be obvious and will in part appear hereinafter.

The invention accordingly comprises the apparatus possessing the construction, combination of elements and arrangement of parts, and which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a fragmentary, perspective view of a film unit useful in the apparatus of the invention;

FIG. 2 is a perspective view of one form of film pack comprising a plurality of film units shown in FIG. 1;

FIG. 8 is a sectional view, taken substantially midway between the sides, of photographic apparatus in the form of a camera embodying the invention;

FIG. 9 is a sectional view taken along the line 9—9 of FIG. 8;

FIG. 10 is a sectional view taken along the line 10—10 of FIG. 8;

FIG. 15 is a fragmentary sectional view taken adjacent one side through photographic apparatus in the form of a camera embodying the invention;

FIG. 16 is a perspective view of another form of film pack useful in the apparatus of the invention;

FIG. 17 is a longitudinal, sectional view of the film pack of FIG. 16 taken substantially midway between the sides;

FIG. 18 is a sectional view taken along the line 18—18 of FIG. 17;

FIG. 19 is a perspective view of a component of the film pack of FIG. 16;

FIG. 20 is a perspective view of another component of the film pack of FIG. 16;

FIG. 21 is a perspective view, partially in longitudinal section, of another form of assemblage of film units shown at one stage in its assembly;

FIG. 22 is a perspective view of the assemblage of FIG. 21; and

FIG. 23 is a fragmentary, sectional view of another form of a camera embodying the invention.

Generally, the photographic apparatus of the invention may be in the form of a camera, camera back, film pack, film pack holder or cassette adapted to be employed with a film pack or assemblage comprising a plurality of individual film units. The apparatus includes means for holding the film pack during exposure, means for feeding individual leaders attached to said film units from said apparatus in proper sequence whereby each leader may be grasped for withdrawing a film unit from the apparatus following exposure thereof, and means for effecting the processing of each film unit as it is withdrawn from the apparatus. The film pack or assemblage comprising the invention and adapted to be employed in said apparatus includes a plurality of film units, each comprising a photosensitive sheet, a second sheet adapted to be superposed with the photosensitive sheet following exposure thereof, a container of a fluid processing composition adapted to be distributed between the superposed photosensitive and second sheets to effect the processing thereof, and leader means for moving the photosensitive and second sheets into superposition and in engagement with means for distributing the processing fluid.

Figure 3:
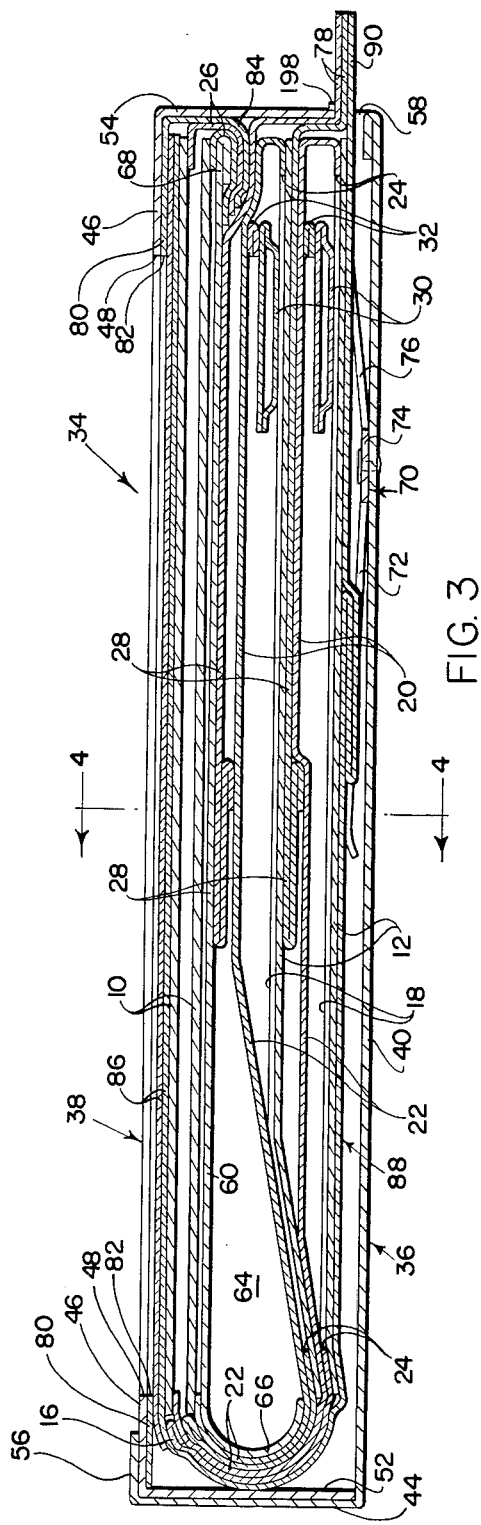
FIG. 3 is a longitudinal, sectional view of the film pack of FIG. 2 taken substantially midway between the sides.
Figure 4:
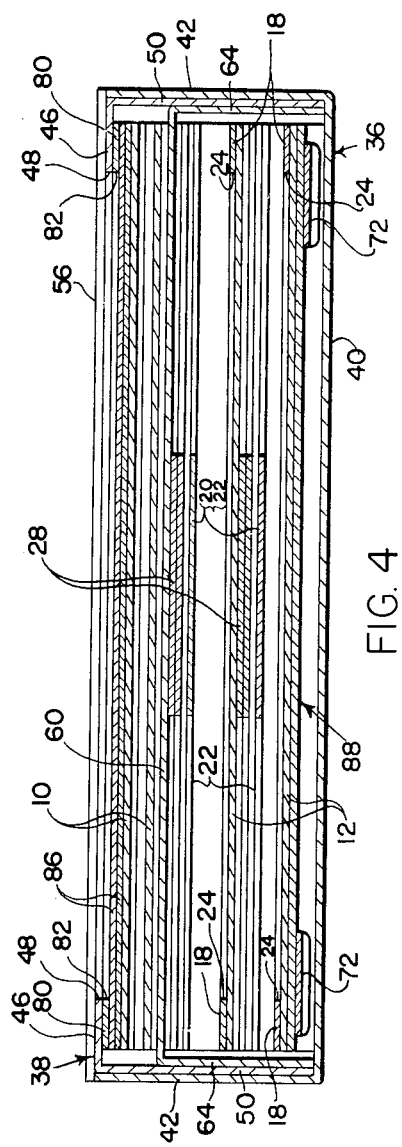
FIG. 4 is a sectional view taken along the line 4—4 of FIG. 3.
Figure 5:
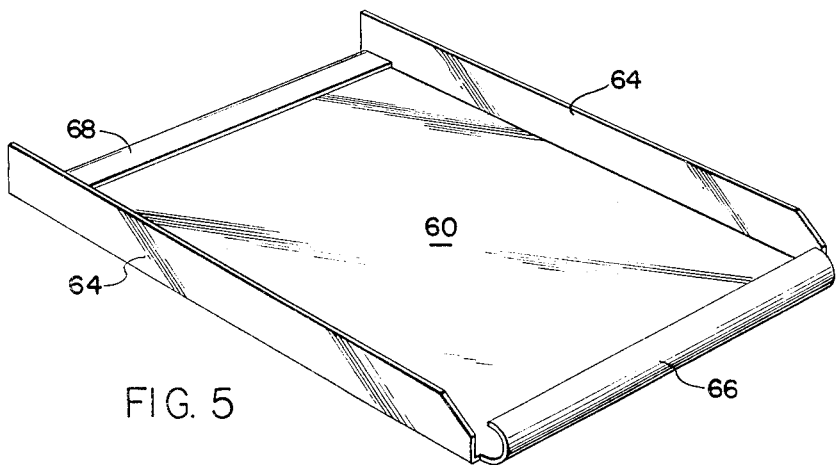
FIG. 5 is a perspective view of one of the components of the film pack of FIG. 2.
Figure 6:
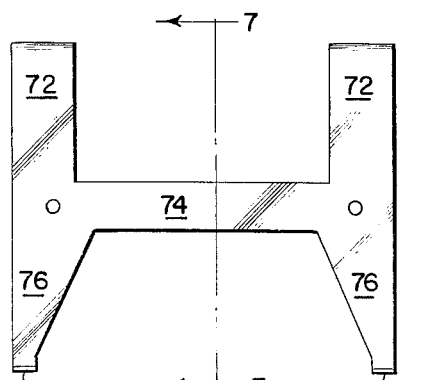
FIGS. 6 and 7 are, respectively, plan and elevational views of another component of the film pack of FIG. 2.
Figure 7:
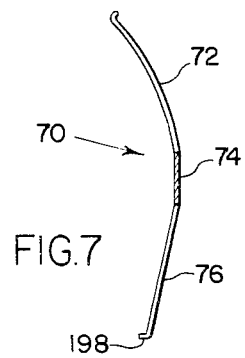
Figure 11:
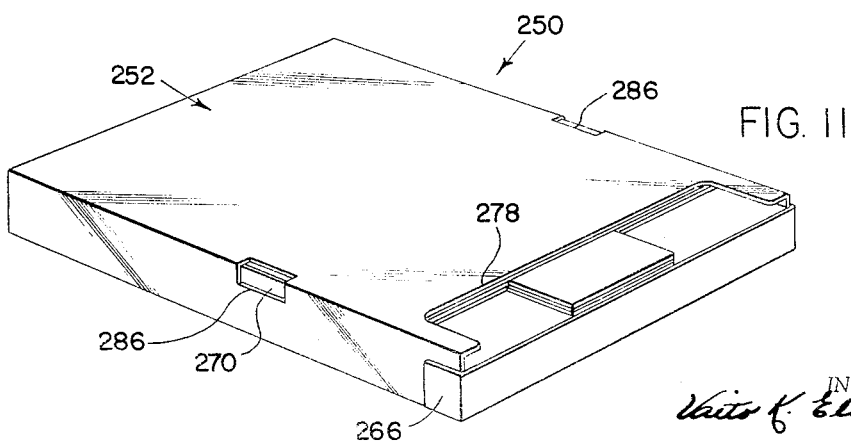
FIG. 11 is a perspective view of another form of film pack useful in the apparatus of the invention.
Figure 12:
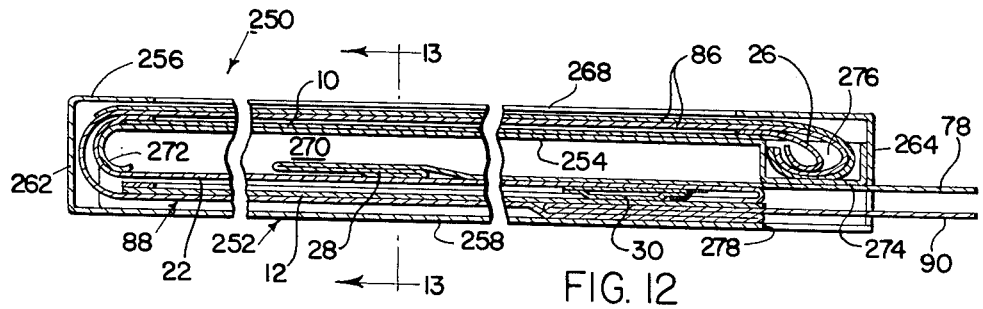
FIG. 12 is a longitudinal, sectional view of the film pack of FIG. 11 taken substantially midway between the sides.
Figure 13:
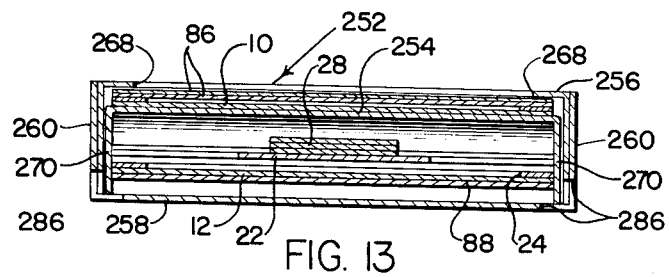
FIG. 13 is a sectional view taken along the line 13—13 of FIG. 12.
Figure 14:
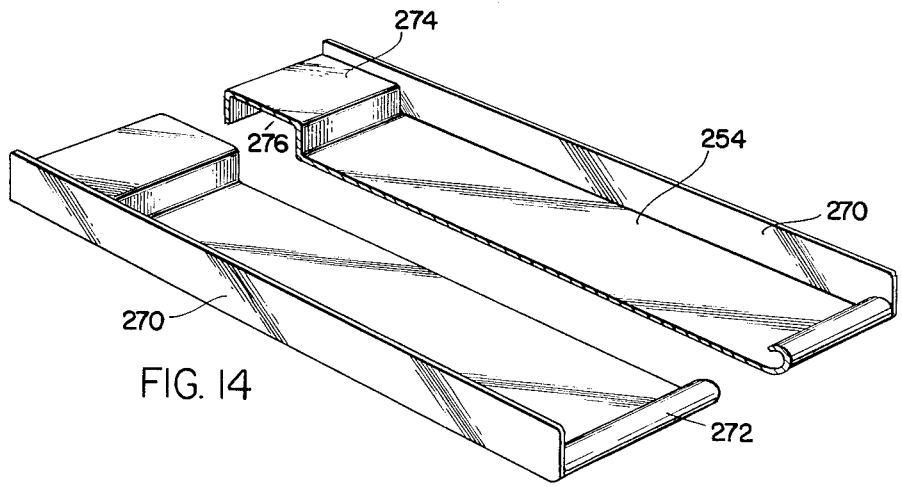
FIG. 14 is a perspective view of a component of the film pack of FIG. 11.

Reference is now made to FIGS. 1 and 3 of the drawings wherein there is illustrated a film unit 8 useful in the apparatus of the invention. Film unit 8 comprises a first or photosensitive sheet 10 and a second or image-receiving sheet 12. The photosensitive sheet is generally rectangular and comprises a layer of photosensitive material carried on a suitable support. The photosensitive material may comprise any of the materials used in photography, including, for example, the silver halides or other photosensitive heavy metal salts capable of having a developable latent image formed therein by exposure, the ferric salts and the diazonium compounds. The support for the photosensitive layer may comprise any of the flexible sheet materials generally used for film base including paper, plastics and the like, and is preferably opaque to light actinic to the photosensitive material, or it includes a layer which is opaque to actinic light. Second sheet 12 is at least coextensive in area with the area or frame of the photosensitive sheet to be exposed and also comprises a flexible sheet material such as paper, plastic and the like. The second sheet, in the form shown, is substantially coextensive in size with the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion-transfer reversal process, such as described in U.S. Patents Nos. 2,543,181, issued February 27, 1951, and 2,662,822, issued December 15, 1953, both in the name of Edwin H. Land. The second sheet, accordingly, may comprise an image-receiving layer, such as described in the above-mentioned patents, carried on a flexible support sheet.

The photosensitive and second sheets are mounted on an elongated carrier sheet 14 formed of a flexible material such as paper, plastic and the like. Carrier sheet 14 is adapted to perform several functions, including providing a leader for connecting the photosensitive and second sheets, properly locating or registering the sheets relative to one another when the sheets are superposed, mounting a container of a fluid processing composition, cooperating in the spreading of the fluid in a layer of predetermined thickness between the photosensitive and second sheets, determining the area to be processed and the dimensions of the transfer image produced in the second sheet and collecting any excess processing fluid. Carrier sheet 14 comprises a trailing end section 16, a rectangular intermediate section 18 preferably coextensive with second sheet 12, a first tapered or convergent section 20 and a second tapered or convergent section 22, the latter two sections being adapted to function as leaders and for mounting a container of processing fluid. Image-receiving sheet 12 is mounted on intermediate section 18 with the receiving layer of sheet 12 located adjacent the carrier sheet. Intermediate section 18 is provided with a generally rectangular aperture 24 defining the area of the image-receiving sheet against which the fluid processing composition is spread and wherein a transfer image is produced. The lateral margins of intermediate section 18 adjacent the sides of aperture 24 cooperate in a manner to be described for confining the processing fluid between the sheets and for controlling the thickness of the layer of fluid spread between the sheets. Photosensitive sheet 10 is secured at its leading edge to the end edge of second tapered section 22 with the emulsion surface of the photosensitive sheet facing in the same direction relative to the carrier sheet as the image-receiving layer of second sheet 12. A trailer sheet 26 is provided attached to the trailing edge of photosensitive sheet 10 and is adapted to cooperate with trailing end section 16 of carrier sheet 14 for collecting and retaining excess processing fluid in a manner to be described hereinafter.

A narrow, elongated leader strip 28 is provided secured to second tapered section 22 at the juncture of sections 20 and 22 substantially midway between the leading edge of second sheet 12 and the leading edge of photosensitive sheet 10. The first and second tapered sections of the carrier sheet are adapted to be folded at this point midway between the photosensitive and second sheets and the film unit is processed by drawing leader 28 and the tapered sections in superposed relation between means for applying compressive pressure to the film unit. The photosensitive and second sheets are thus registered with one another in superposed relation by drawing on leader 28 so as to cause the tapered sections to fold at a point intermediate the leading edges of the photosensitive and second sheets. As a means for overcoming any tendency of second tapered section 22 to peel from leader 28 where the leader and tapered section are attached, the two tapered sections 20 and 22 may be made somewhat longer than the minimum required and portions of the surfaces of the tapered sections opposite leader 28 on both sides of the fold or crease are adhered to one another.

The photosensitive and second sheets are adapted to be processed by a fluid composition carried in a rupturable container, designated 30, mounted on first tapered section 20. The container is formed substantially as shown in the above-mentioned U.S. Patent No. 2,543,181 and comprises a rectangular blank of fluid- and air-impervious sheet material folded longitudinally upon itself to provide two walls bonded together at their margins to form an elongated cavity for the processing fluid. The longitudinal seal is weaker than the end seals and is adapted to become unsealed in response to hydraulic pressure generated within the fluid contents of the container by the application of compressive pressure thereto. Container 30 is mounted on first tapered section 20 on the side thereof opposite second sheet 12 by a hinge strip 32. The container extends substantially from side to side of the carrier sheet and the liquid cavity thereof is preferably at least equal in length to the width of aperture 24 in the carrier sheet. Container 30 is mounted with the longitudinal edge, which is adapted to become unsealed, facing the second sheet and located adjacent the leading edge thereof.

Film unit 8, when assembled for exposure, is positioned with first and second tapered sections 20 and 22 folded at the first tapered section adjacent the leading edge of the second sheet against the image-receptive surface of the second sheet. Second tapered section 22 is folded adjacent the leading edge of photosensitive sheet 10 so that the latter is folded back against the first and second tapered sections with the emulsion surface of the photosensitive sheet facing in the same direction as the image-receptive surface of the second sheet. It will be noted that in this position of film unit 8 the photosensitive layer of the photosensitive sheet is located outermost so that it can be exposed. The image-receptive layer of the second sheet faces inwardly and the first and second tapered sections of the carrier sheet are disposed between the photosensitive and second sheets. Container 30, in this assembled position of the film unit, is disposed with the longitudinal edge, adapted to become unsealed, facing the trailing end of the second sheet and the leading end of the photosensitive sheet.

An assemblage of film units, in the form of a film pack 34, is illustrated in FIGS. 2 through 7 of the drawings. The film pack comprises a housing formed of a rear section 36 and a forward section 38 preferably adapted to fabrication from thin sheet metal. Rear section 36 includes a rear wall 40, side walls 42 and an end wall 44. Forward housing section 38 comprises a forward wall 46 having a rectangular exposure aperture 48, side walls 50, a trailing end wall 52 projecting from the forward wall by substantially the same amount as the side walls and a leading end wall 54 which projects from the forward wall by a lesser amount. The two housing sections are assembled together with side walls 50 of forward section 38 located between side walls 42 of rear section 36. A lip 56 is provided on end wall 44 adapted to be folded over the trailing end of forward wall 46 for retaining the two housing sections in assembled position. In the assembled position of the housing sections there is formed a housing having a rectangular opening in its forward wall and a narrow slot or opening 58 in its leading end wall between the rear edge of leading end wall 54 and rear wall 40.

Mounted within the film pack housing is a substantially flat pressure plate 60 having dependent flanges 64 at its sides, a rolled end section 66 at its trailing end and a folded edge portion 68 at its leading end, the folded edge portion being provided for the purpose of adding structural stability to the pressure plate. The pressure plate is mounted within the housing with flanges 64 and rolled end section 66 extending toward rear wall 40 of the housing, and is so dimensioned that the pressure plate extends substantially from side to side and from end to end of the housing. A generally H-shaped spring 70 is provided secured to the rear wall of the housing for urging the pressure plate forward against the forward wall of the housing across aperture 48. Spring 70, in the form shown, comprises a pair of curved spring arms 72 extending toward the trailing end of the housing and the forward wall thereof and connected by a transverse member 74. Spring 70 also includes a pair of engagement arms 76 extending from transverse member 74 in a direction opposite spring arms 72 and constructed to perform a function which will be described in greater detail hereinafter. Spring arms 72 are adapted to bear against the rear of pressure plate 60, urging it toward the forward wall of the film pack housing.

Each film unit 8 of the film pack is disposed within the housing with the photosensitive sheet thereof located forward of the pressure plate between the pressure plate and the forward wall of the housing. The rectangular intermediate section 18 of each film unit 8 is bent around rolled end section 66 and the second sheet, first and second tapered sections and leader strip are disposed behind the pressure plate between it and the rear wall of the housing. A plurality of film units 8 are provided in the housing, each arranged in the same manner with the photosensitive sheets arranged in one stack in front of the pressure plate and the second sheets arranged in another stack behind the pressure plate. The photosensitive sheets extend across aperture 48 in position for exposure through the aperture and the second sheets are located between spring arms 72 and the pressure plate so that the force of the springs is transmitted to the pressure plate through the second sheets. It will be noted that the ends of spring arms 72 are so located with respect to tapered sections 20 and 22 that the spring does not bear against the tapered sections.

Each leader strip 28 is folded back upon itself toward the trailing end of the film pack and thence forward, so that only a relatively short portion of the leader strip projects beyond the leading edge of the second sheet from between the second sheet and the photosensitive sheet. This short leader portion, designated 78, of leader strip 28 projects from the housing through slot 58. The trailer sheets 26, attached to the trailing ends of the photosensitive sheets, are folded around and behind the trailing end of pressure plates 60 so as to lie between the latter and the second sheets and portions of the carrier sheet also disposed behind the pressure plate. Trailing end section 16 of each carrier sheet, which extends from the trailing end of each second sheet, is folded forward upon itself and is bent around the rolled end section 66 of the pressure plate so as to lie between the rolled end section and the trailing end wall of the housing.

A means is provided for precluding exposure of photosensitive sheets 10 by light entering the slot 58. In the form shown, this means comprises an elongated sheet 80 of a light-opaque material substantially equal in width to forward wall 46 and substantially longer than the forward wall. Light-shielding sheet 80 is secured to the inner surface of forward wall 46, is provided with an aperture 82 coincident with aperture 48 in the forward wall, and includes a leading end section 84 disposed adjacent leading end wall 54 and extending rearward and between the portions of trailer sheets 26 folded around the leading end of pressure plate 60 and the second and carrier sheet stacked behind the pressure plate. The film pack assemblage also includes means for closing apertures 48 and 82 to prevent exposure of the photosensitive sheets through said apertures. This last-mentioned means comprises a pair of cover sheets 86 located in superposed relation across apertures 48 and 82 between the forward wall and the foremost photosensitive sheet 10. Cover sheets 86 are formed of a light-opaque sheet material, for example black paper, and both sheets are provided in superposed relation to preclude any chance of exposure of the foremost photosensitive sheet due to minute holes in the cover sheets. A leader 88 is provided connected to the leading end of the cover sheets located at the trailing end of the film pack. Leader 88 extends around the rolled end section of the pressure plate between the second elements and rear wall 40 of the rear housing section. Leader sheet 88 is folded back upon itself and includes a leading end section 90 projecting from the housing through slot 58. The fold in the leader sheet is provided to permit partial withdrawal of the leader sheet from the housing prior to movement of cover sheets 86 in response to withdrawal of the leader sheet.

The forward and rear housing section, the spring and the pressure plate should have some structural strength and rigidity and, accordingly, are preferably formed of sheet metal. The two housing sections are retained together at their leading ends by any suitable means such as tapes or by tabs 89 formed on the side walls 42 of the rear housing section.

Another form of film pack embodying the invention is illustrated in FIGS. 16 through 21. This film pack, designated 91, is characterized by an assembly which eliminates the front and rear housing sections, thereby effecting a saving in the material required for the film pack housing. The film pack 91 comprises a pressure plate 92, similar in most respects to pressure plate 60, having two lateral dependent flanges 94, a rolled trailing end section 96, and a folded leading end section 98. Lateral flanges 94 include spring portions 100 which project inwardly toward one another and mount pairs of spring arms 102 extending generally parallel to flanges 94 and biased away from pressure plate 92. The arrangement of film units 8 and cover sheets 86 is essentially the same as the arrangement thereof in film pack 34. Instead of a housing, however, there is provided a U-shaped enclosure member 104 having two lateral portions 106 for engaging the sides of the film pack and a transverse end portion 108 for engaging the trailing end of the film pack. Enclosure member 104 comprises a strip of sheet metal having a U-shaped or channel-shaped cross section and is engaged around the side and the trailing end of the film pack. The film pack also includes a retaining member 110 formed of sheet metal and secured at the leading end of the film pack in engagement with the leading ends of lateral portions 106 for retaining the enclosure member in surrounding relation to the film pack. Retaining member 110 in the form shown comprises a single blank of sheet metal folded to form an L-shaped transverse member 111 having a forward portion 112 which extends in front of the leading edge portion of the film pack and, together with lateral portions 106 and end portions 108 of enclosure member 104, cooperates to define an aperture in the front of the film pack. Transverse member 111 includes an outer end wall portion 114 adapted to provide a leading end wall for the film pack. The transverse member includes an inner end wall portion 116 providing slots adapted to receive the leading end sections of lateral portions 106. Retaining member 110 also includes end sections 118 which extend rearward to the exterior of lateral portions 106 at the leading ends of the latter and thence toward one another at the rear of lateral portions 106. End sections 118 include folded sections 120 which are engaged around portions of the leading ends of lateral portions 106.

A rear wall is provided for the film pack assemblage by a rectangular panel 122 formed of a relatively rigid sheet material such as cardboard. Panel 122 is secured to leader sheet 88 and is disposed behind the second sheet within the enclosure formed by U-shaped member 104. When the film pack has been loaded into the camera or other apparatus which is to be employed, panel 122 may be withdrawn along with cover sheet 86 from the film pack by drawing on leader 88 and the leading end section 90 thereof. As previously noted, the pressure plate includes two pairs of spring arms 102 which project inwardly toward one another from lateral flanges 94 of the pressure plate. The second sheet of the film unit, together with panel 122, is disposed between spring portion 100 and the pressure plate so that spring arm 102 will bear against the inside of the channel-shaped lateral portions 106, thereby urging the pressure plate forward toward the front of the film pack so as to position the photosensitive sheet for exposure against the forward sides of channel-shaped lateral portion 106 and end portion 108 and forward portion 112 of transverse member 111. In still another alternative embodiment of film pack 91, the springs may be eliminated entirely and springs may be provided as elements of the camera or apparatus in which the film pack is intended to be employed.

Reference is now made to FIGS. 8 through 10 of the drawings wherein there is shown photographic apparatus embodying the invention and adapted for employing film packs of the type described. The apparatus may be in the form of a cassette, film pack adapter or film pack holder for use with a camera or, as shown, in the form of a camera 124 comprising a forward housing section 126 and a rear housing section 128. Forward housing section 126 includes a forward housing wall 130 having a recessed section 132 including an aperture 134 through which exposures can be effected. A hinged forward wall 136 is provided for covering recessed section 132 and mounting a conventional lens and shutter assembly 138, the latter being connected to recessed section 132 by a collapsible bellows 140 secured at one end to the lens and shutter assembly and secured at its rear end to the recessed section around aperture 134. In lieu of forward wall 136, lens and shutter assembly 138 and the bellows 140, the forward and rear housing sections of the apparatus may be constructed in the form of a camera back or film pack adapter intended to be mounted on and coupled with the back of a camera.

Rear housing section 128 includes a rear wall 142 which cooperates with forward housing section 126 to provide a chamber 144 behind aperture 134 for containing a film pack, of the type described, in position for exposure across aperture 134. This film pack, for example that designated 34 and shown in FIG. 2, is adapted to be mounted in chamber 144 with forward wall 46 of the pack against the rear surface of recessed section 132 and with aperture 48 in alignment with aperture 134. Resilient means such as pads 146 may be provided on rear wall 142 for holding the film pack against the recessed section 132 of forward wall 130. Rear housing section 128 is preferably pivotally mounted on forward housing section 126 adjacent one end of the housing, herein shown and designated for purposes of description as the upper end of the housing, by hinge 148, thereby permitting the separation of the two housing sections for loading of a film pack into chamber 144. Suitable latch means (not shown) of conventional type are provided at the opposite (lower) end of the housing for retaining the two housing sections together in the closed or operative position shown in the drawings.

The film units comprising the film pack are adapted to be exposed and thereafter processed by being withdrawn from the camera between a pair of pressure-applying members for distributing a processing fluid between the photosensitive and second sheets of each film unit. Camera 124, accordingly, comprises a pair of pressure-applying members in the form of elongated rolls 150 and 152 comprising a pressure-applying device mounted within the housing adjacent the lower end thereof. Pressure-applying rolls 150 and 152 are mounted for pivotal movement in juxtaposition with their axes in a common plane and are biased toward one another for applying compressive pressure to the sheets of a film unit as said film unit is drawn therebetween. As a means for mounting pressure-applying rolls 150 and 152, there is provided a generally U-shaped support member 154 having a pair of parallel arms 156 joined by a connecting member 158. Each of arms 156 includes a keyhole-shaped slot 160. Roll 150 is provided with stub shafts 162 at its ends rotatably journaled in bushings 164 engaged in slots 160. Roll 152 is mounted in a similar manner for rotation about stub shafts 166 extending from its ends and journaled in bushings 168 engaged in slots 160. A spring 170 is provided mounted intermediate its ends on connecting member 158 between the latter and roll 152 with its ends in engagement with bushings 168 for urging roll 152 toward 150.

Spreading of the processing fluid from a container 30 between a photosensitive sheet 19 and a second sheet 12 is effected by advancing the sheets in superposition between rolls 150 and 152 commencing with the leading end portions of the sheets in the region of the container. In order to insure spreading of the fluid in a layer of predetermined depth completely over the area of the second sheet bordered by aperture 24, the amount of fluid usually provided in container 30 is in excess of that required for the layer of fluid. Trailing end section 16 and trailer sheet 26 are adapted to cooperate with rolls 150 and 152 for collecting and retaining any excess fluid spread from between the trailing ends of the photosensitive and second sheets. This is accomplished by constructing the pressure-applying rolls and bushings 164 and 168 so that the bushing engage one another and retain the rolls spaced apart from one another by a fixed minimum amount providing a gap between the rolls having a depth substantially greater than the combined thickness of the trailing end section 16 and trailer sheet 26. By virtue of this arrangement, as the trailing end section and trailer sheet move between the rolls, a space is provided between the trailing end section and trailer sheet in which excess fluid may be collected and retained. The minimum depth of the gap between rolls 150 and 152 is approximately equal to the combined thicknesses of photosensitive sheet 10, second sheet 12 and the layer of fluid to be spread therebetween.

As previously noted, trailing end section 16 is folded back upon itself to form two adjacent portions which cooperate to function in the manner of a container for collecting and retaining any excess processing fluid. As the photosensitive and second sheets are drawn between the pressure-applying members, the folded sections of trailing end section 16 tend to remain spaced apart slightly so that any excess processing fluid enters between the two folded sections and is retained therein as the folded sections move between the pressure-applying members, in spite of any application of compressive pressure to the folded sections by the pressure-applying members. This form of trapping means finds particular utility where the minimum gap between the pressure-applying members is small so that the spacing between the trailing end section 16 and trailer sheet 26 is also small and might prove insufficient to retain all of the excess fluid squeezed from between the trailing ends of the photosensitive and second sheets.

Pressure-applying rolls 150 and 152, support member 154 and their associated elements comprise a unit mounted on forward housing section 126 between forward wall 130 and rear wall 142 adjacent the lower end of the camera housing. An opening 172 is provided in the lower end of the housing in alignment with the gap between the pressure-applying rolls to permit movement of the sheet materials between the rolls and from the camera.

The film pack, mounted within the camera, is positioned for exposure and disposed entirely within the camera with leaders 78 and 90 located within the camera on the inside of rolls 150 and 152. The camera, accordingly, includes means for advancing leaders 78 and 90, one at a time, between the pressure-applying rolls from the camera through opening 172 in the lower end of the camera housing where the leaders may be grasped for drawing cover sheets 86 and the film units from the camera between the pressure-applying rolls. In order to maintain the overall size of the camera as small as possible, the spacing between the pressure-applying rolls and the lower or leading end of the film pack is kept to a minimum and is, in fact, substantially less than the length of the leader advanced between the rolls from the camera through passage 172. Accordingly, the means for advancing the leaders, and which engage the leaders at a position intermediate the pressure-applying rolls and the film pack, are movable in engagement with the leaders through a distance which is substantially less than the distance that the leaders are moved.

The leader advancing means are manually operable from the exterior of the camera and, in the form shown, comprise a pair of rolls 174 having friction-generating surfaces adapted to engage the leaders while rolls 174 are simultaneously moved downward toward pressure-applying rolls 150 and 152 and are rotated (counterclockwise). Rolls 174 are mounted adjacent rear wall 142 between the lower or leading end of the film pack and pressure-applying rolls 150 and 152 are adapted to be displaced toward the front of the camera for engaging and advancing the leaders. To facilitate engagement of the leaders there is provided a backing member located in front of the leaders and against which rolls 174 are adapted to act. Rolls 174 are formed of a material having a high coefficient of friction such as rubber, while the leaders, being formed of paper, and the rear surface of backing member 176 have a relatively lower coefficient of friction so the rolls can engage and move the rearmost leader relative to any remaining leaders and to the backing member.

As a means for mounting and rotating rolls 174, there is provided a support plate 178 preferably formed of a resilient sheet material such as sheet metal. Support plate 178 is elongated and generally rectangular in shape and includes a pair of upstanding support brackets 180 on one end extending parallel to one another toward the front of the camera housing for mounting rolls 174. Rolls 174 are secured to the end of a shaft 182 mounted for rotation on support brackets 180 with the rolls disposed outside of the brackets and the peripheries of said rolls projecting forward of the brackets. Support plate 178 is secured at its end opposite rolls 174, to a slide plate 184 mounted for sliding or reciprocating rotating movement against the inner surface of rear wall 142 by a retaining plate 186. Slide plate 184 is wider than support plate 178 and is engaged at its edges between rear wall 142 and portions of retaining plate 186 surrounding a slot 188 in the retaining plate. Retaining plate 186 is so formed and slot 188 is so dimensioned as to permit support plate 178 to extend through slot 188 and be reciprocated in the direction of the ends of the camera housing.

Support plate 178 is normally positioned with its lower end (mounting rolls 174) against slide plate 184 and, being resilient, can be deformed forward away from the slide plate for moving rolls 174 toward backing member 176 and into engagement with leaders located between the rolls and backing member. A manually engaged button 190 is secured to support plate 178 and projects rearward from the housing through an opening 192 in slide plate 184 and a slot 194 in rear wall 142. Button 190 is adapted to be engaged and pressed inward and downward for simultaneously deforming support plate 178 so as to move rolls 174 forward toward member 176 into engagement with leaders and for moving the support plate and rolls downward toward rolls 150 and 152 with rolls 174 held in engagement with a leader.

As a preferred means for rotating rolls 174 in a counterclockwise direction as said rolls are moved downwardly toward rolls 150 and 152 in engagement with a leader held against backing member 176, there is provided a negator spring 196 secured at one end to shaft 182, coiled around the shaft in a counterclockwise direction and secured at its other (upper) end with respect to rear wall 142, preferably on retaining plate 186 above rolls 174. By virtue of this arrangement, as shaft 182 and rolls 174 are displaced downwardly relative to the camera housing, negator spring 196 is caused to uncoil, imparting a counter clockwise rotary movement to the rolls. The negator spring performs the additional function of returning rolls 174 upward to their initial position when button 190 is released by virtue of the tendency of the negator spring to recoil itself.

An alternate arrangement (not shown) for rotating rolls 174 as they are displaced downwardly and returning the rolls from their displaced position may comprise a flexible connecting element such as a wire cord or the like, fixed at one end to the camera housing at a position above rolls 174. A section of the flexible element intermediate its ends is coiled around shaft 182 in a counterclockwise direction and is secured to the shaft. The element is connected at its other end to an extension spring which is in turn connected to the upper end of support plate 178. In this arrangement, as the rolls are moved downward, the portion of the connecting element between the fixed end and the point of attachment to shaft 182 and which is wound around the shaft unwinds from the shaft, rotating the shaft and rolls. A portion of the connecting element between the shaft and the spring is coiled on the shaft and the spring is tensioned so that, when button 190 is released, the spring returns the rolls from their displaced position.

Camera 124, when loaded with a film pack such as film pack 34, is adapted to be employed for making photographs by first engaging button 190 and pressing the button inward and downward for advancing leader 90 connected to cover sheets 86 between pressure-applying rolls 150 and 152 through passage 172 from the camera. Leader 90 may then be grasped for drawing cover sheets 86 around the end of pressure plate 60, from the film pack, between the pressure-applying rolls, and from the camera. Each film unit is processed following exposure in a similar manner. The operator engages button 190, pressing it inward and downward for advancing a leader 78 between the pressure-applying rolls from the camera, so that the leader may be grasped for drawing the photosensitive sheet 10 around rolled end section 66 of pressure plate 60 into superposition with the corresponding second sheet 12, and then drawing the photosensitive and second sheets in superposition between the pressure-applying rolls from the camera. During movement of second tapered section 22 and then the photosensitive sheet around the trailing end of the pressure plate and into superposition with the second sheet, first tapered section 20 is required to roll upon itself, this action being facilitated by virtue of the taper of the two sections and by creasing or prefolding the carrier sheet along a transverse line at the junction of sections 20 and 22.

As cover sheets 86 or a photosensitive sheet 10 are being drawn around the end of pressure plate 60 and behind the pressure plate from the film pack, frictional forces may be exerted by the moving sheets on the sheets remaining in the pack, tending to move the second sheets 12 contained in the pack from the pack toward the pressure-applying rolls. Means are provided for preventing movement of the second sheets through opening 58 from the pack and, in the form shown, this means comprises short dependent flanges 198 on the ends of engagement arms 76. Engagement arms 76 extend through opening 58 in the leading end of the film pack and flanges 198 project toward the front of the film pack so as to engage the leading edge of the rearmost second sheet 12 and prevent movement of the rearmost second sheet through opening 58 from the film pack. Engagement arms 76 extend on opposite sides of leaders 90 attached to the film units so as not to interfere with movement of the leaders and so as to engage the leading end of the rearmost second sheet during movement of the leaders through opening 58. When the photosensitive sheet of a film unit has been drawn into superposition with the second sheet of the same film unit, which second sheet is the rearmost second sheet of the pack, the two sheets are drawn through opening 58, deflecting the free ends of engagement arms 76.

Reference is now made to FIGS. 11 through 14 of the drawings wherein there is shown another form of film pack, designated 250, embodying the invention and comprising a housing or container 252 adapted to be fabricated from stiff paper or cardboard, and having, as its only metal part, a pressure plate 254 formed of thin sheet metal. Container 252 is generally parallelepiped in shape, having a rectangular forward wall 256 and a rear wall 258, both substantially equal in width to film unit 8 and equal in length to the portion of film unit 8 comprising photosensitive sheet 10 and trailer sheet 26 or the portion comprising second sheet 12 and portion 78 of leader 28 projecting beyond the leading end of the second sheet. Forward and rear walls 256 and 258 are joined together by side walls 260 and a trailing end wall 262 to form a container open at its leading end. A leading end wall 264 is provided joined to forward wall 256 and extending toward rear wall 258 across the open leading end of container 252 for partially closing the leading end of the container. Container 252 is preferably formed from two blanks of relatively stiff sheet material such as cardboard, with side walls 260 and end wall 262 comprising overlapping portions of the two blanks. End wall 264 preferably comprises a flap on the leading end of the panel of the blank comprising forward wall 256 and is folded across the open leading end of the container after a plurality of film units 8 and pressure plate 254 have been loaded into the container. The flap comprising leading end wall 264 is held in place by tabs 266 secured to side walls 260. Forward wall 256 is provided with a rectangular exposure aperture 268 through which photosensitive sheets positioned within the container are adapted to be exposed.

Pressure plate 254 is substantially rectangular in shape, being approximately equal in width to film units 8 and including rearwardly extending lateral flanges 270, a rolled end section 272 at its trailing end between lateral flanges 270 and a step or raised section 274 at its leading end having a substantially flat support surface and a generally U-shaped cross section. Pressure plate 254 is mounted within container 252 with flanges 270 disposed against side walls 260 and extending toward rear wall 258 and step 274 located adjacent leading end wall 264. A plurality of film units 8 are mounted within container 252 in essentially the same manner as in film pack 34 with photosensitive sheets 10, located between pressure plate 254 and forward wall 256, in alignment with exposure aperture 268 and with second sheets 12 and the leaders dispersed behind the pressure plate between it and rear wall 258. Trailer sheets 26 are disposed in a recess 276 formed by the forward side of step 274, while portions 78 of leaders 28 are located within the container supported on the rear surface of step 274 between the latter and rear wall 258. Film pack 250 also includes cover sheets 86 located across aperture 268 in closing relation thereto and a leader 88 having a leading end section 90 also supported on step 274.

A portion of photographic apparatus, such as a camera adapted for employing film pack 250, is illustrated in FIG. 15 of the drawings and includes pressure-applying means and leader means substantially as shown and described in connection with camera 124. This apparatus differs from camera 124, however, in regard to the means for supporting the leaders for engagement with rolls 174, this last-mentioned means being a part of the film pack instead of the camera; and with regard to the spring for urging pressure plate 254 and the photosensitive sheets forward into position for exposure and the means for engaging and retaining the leading ends of the second sheets in the film pack during withdrawal movement of a leader from the film pack, the last-mentioned means comprising elements of the camera rather than the film pack.

To permit rolls 174 to engage leaders supported on the rear surface of step 274, rear wall 258 is provided with a generally U-shaped recess or cut-away section 278 in the region of rear wall 258 overlying step 274. A pair of L-shaped engagement members 280 are provided pivotally mounted at the intersection of the arms of each of said members on rear wall 142 at opposite sides of rolls 174. Each of engagement members 280 is mounted with one arm extending forwardly toward step 274 and with the other arm extending upwardly adjacent rear wall 142 for positioning the first-mentioned arm. Means such as tension springs 282 are provided for urging engagement members 280 in a clockwise direction (viewing FIG. 15) into the operative position shown. The forwardly extending arms of members 280 are adapted to engage the leading edge of the rearmost film unit adjacent opposite sides of leaders 90 and portions 78 for preventing movement of the second sheets during withdrawal movement of a leader.

A pair of springs 284 are provided mounted at their ends on rear wall 142 adjacent the sides of the camera housing. The free ends of springs 284 are adapted to extend forwardly for engaging flanges 270 of the pressure plate 254 of a film pack 250 mounted within the camera housing for urging the pressure plate forward. To permit engagement of the flanges of the pressure plate by springs 284, openings 286 are provided in the lateral edge portions of film pack 250 extending through rear wall 258 and side walls 260. A relatively flexible sheet material, such as black paper, plastic, cloth or the like, may be provided for covering openings 286 to prevent the admission of light through the openings into the film pack.

Still another form of film pack 200 embodying the invention is illustrated in FIGS. 21 and 22 of the drawings and comprises a plurality of film units 8, cover sheets 86 and a container or envelope 202 for enclosing the film units and cover sheets. The construction of film pack 200 is such as to eliminate the necessity for a rigid container or housing, a pressure plate and springs for biasing the pressure plate, these elements being provided as part of the apparatus in which the film pack is adapted to be exposed and processed. Envelope 202 is substantially equal in length and width to film unit 8 as shown in FIG. 1, that is, equal in length to the portion of the film unit including first and second tapered sections 20 and 22, photosensitive sheet 10 and trailer sheet 26 and adapted to be positioned for exposure in front of the pressure plate. Envelope 202, in the partially assembled form of the film pack shown in FIG. 21, comprises a first rectangular panel 204, a second rectangular panel 206, and a trailing end panel 208 and side panels 210 connecting the first and second panels to form a container open at one end, the open end being designated the leading end.

Envelope 202 comprises two sections, the first or leading end section including the open end of the container being approximately equal in length to the portion of film unit 8 including second sheet 12, and adapted to contain the second sheets of a plurality of film units. The second or trailing section is substantially longer than the first section, being approximately equal in length to a photosensitive sheet and trailer sheet 26, and is adapted to contain the photosensitive and trailer sheets of a plurality of film units. A rectangular exposure aperture 212 is provided in the portion of first panel 204 comprising the second section of envelope 202 whereby photosensitive sheets positioned within the second section may be exposed. The first and second envelope sections are joined by an intermediate section 214 wherein first panel 204 and side panels 210 are provided with expansible pleats, or folds, which permit folding of the first and second sections at intermediate section 214 back upon one another (as shown in FIG. 22), so that the two sections of second panel 206 are disposed innermost adjacent one another and the first and second sections of first panel 204 are disposed outermost.

Film pack 200 is assembled by introducing a plurality of film units 8 into envelope 202 in stacked relation with trailer sheets 26 located at the trailing end of the envelope against end panel 208 and photosensitive sheets 10 underlying exposure aperture 212. A pair of cover sheets 86 are introduced along with the film units so as to close exposure aperture 212. The second sheets and the leaders of the film units and cover sheets are disposed within the first section of the container with the leading end portions of the leaders projecting through the open end of the container. The container is then folded upon itself at intermediate section 214 so that the two sections of first panel 204 located outermost and with a portion of the second section of the container, which is longer than the first section of the container because of the necessity for accommodating trailer sheets 26, extend beyond the leading open end of the first section of the container. Suitable means, such as tapes 216, are provided for joining the two sections of the container adjacent the open end of the container and at the lateral margins of the two sections, for retaining the two sections in the folded, assembled position with a space between the first and second container sections.

It will be noted that, except for the trailer sheets, the film units in the assembled pack 200 are arranged in substantially the same positions as they are in pack 34, shown in FIG. 3. The photographic apparatus in which pack 200 is adapted to be employed includes a spring and pressure plate, the pressure plate being adapted to be positioned between the first and second sections of the container and the spring being adapted to act against panel 204 of the first section of the container. Photographic apparatus of this type is illustrated in FIG. 23 of the drawings in the form of a camera 218, similar, insofar as the exposure means, pressure-applying means and leader-advancing means are concerned, to camera 124, shown in FIG. 8. Camera 218 includes a backing member 220 against which rolls 174 operate, and a space 222 is provided between backing member 220 and forward wall 130 adapted to receive and hold the trailing end portion of the second section of container 202.

A pressure plate 224, having lateral flanges 226 projecting rearwardly at its edges and a rolled end portion 228 at its upper end, is provided in chamber 144. Pressure plate 224, similar in most respects to pressure plate 60, is mounted for pivotal movement at its lower end on pins 230 secured in backing member 220 and projecting into slots 232 in the lower ends of flanges 226. This mounting arrangement not only permits the pressure plate to be pivoted about pins 230 but allows for movement of the pressure plate toward and away from recessed section 132. A generally H-shaped spring 234, similar to spring 70, is mounted within chamber 144 on rear wall 142. Spring 234 includes a pair of spring arms 236 extending upwardly and forwardly and a pair of engagement arms 238 extending downwardly and forwardly toward the upper end of backing member 220.

Film pack 200 is adapted to be loaded into camera 218 by removing the rear housing section and pivoting the free end of pressure plate 224 outward so that the film pack can be slipped over the pressure plate so that the two sections of envelope 202 are disposed on opposite sides of the pressure plate and rolled end portion 228 thereof is located against the inside of folded intermediate section 214 of envelope 202. The pressure plate is then pivoted forward so that the second section of the container, including the photosensitive sheets, is disposed between the pressure plate and recessed section 132 with exposure aperture 212 of the container coincident with exposure aperture 134 in recessed section 132. The first section of the container is located behind the pressure plate and the rear housing section 128 is then moved to a closed position so that spring arms 236 bear against the film pack, urging the pressure plate and photosensitive sheets forward against recessed section 132 into position for exposure.

As a means for preventing movement of the rearmost second sheet from envelope 202 toward the pressure-applying rolls during withdrawal of a leader from the envelope and during movement of a photosensitive sheet 10 from the second section of the envelope into the first section of the envelope into superposition with the rearmost second sheet, engagement arms 238 of spring 234 are provided with short, forwardly projecting flanges 240 adapted to engage the leading edges of the second sheets and function in a similar manner to flanges 198, previously described in connection with the construction and operation of camera 124.

Since certain changes may be made in the above apparatus without departing from the scope of the invention herein involved, it is intended that all matter contained in the above description or shown in the accompaying drawings shall be interpreted as illustrative and not in a limiting sense.

What is claimed is:

1. Photographic apparatus for use with a photographic film unit for moving a first sheet, comprising said film unit, within said apparatus and from said apparatus, said apparatus comprising, in combination, a housing for enclosing and positioning said sheet, a first opening in said housing for allowing the withdrawal of said sheet from said housing, means within said housing of said apparatus for engaging and moving a second sheet, comprising said film unit and coupled with said first sheet, relative to said first sheet through said opening from said housing, a second opening in said housing, the last-mentioned means including a first element movable within said housing for engaging said second sheet and a second element coupled with said first element and projecting from said housing through said second opening, said second element being movable through a predetermined distance for effecting the movement of said second sheet a greater distance through said first opening sufficiently for said second sheet to be grasped exterior of said housing for withdrawing said first sheet from said housing, and means for so holding said film unit within said housing as to retain said first sheet substantially stationary during movement of said second sheet through said opening.

2. Photographic apparatus for use with a photographic film unit for exposing a photosensitive sheet, comprising said film unit, and moving said sheet from one position to another within said apparatus, said apparatus comprising, in combination, a housing for enclosing and mounting said film unit with said photosensitive sheet in position for exposure, means including a first opening in said housing for exposing said photosensitive sheet, a passage in said housing for allowing the withdrawal of said film unit from said housing, means within said housing for engaging and moving a leader, associated with said sheet, relative to said sheet through said passage from said housing, a second opening in said housing, the last-mentioned means including a first element for engaging said leader within said housing and a second element coupled with said first element projecting from said housing through said second opening and being movable through a predetermined distance for so moving said first element as to effect the movement of said leader through said passage a greater distance sufficient for said leader to be grasped for withdrawing said sheet from said housing, and means for so holding said film unit within said housing as to retain said sheet stationary during said movement of said leader through said passage.

3. Photographic apparatus for use with a photographic film unit and for moving a sheet, comprising said film unit, from one position to another within said apparatus and from said apparatus, said apparatus comprising, in combination, a housing for enclosing and predeterminedly positioning said sheet, a first opening in said housing through which said sheet can be withdrawn, a pair of juxtaposed pressure-applying members mounted within said housing adjacent said opening, a second opening in said housing, means within said housing for engaging and moving a leader, associated with said sheet, relative to said sheet between said pressure-applying members and through said opening from said housing, the last-mentioned means including a first member within said housing for engaging said leader and a second member coupled with said first member and projecting from said housing through said opening, said second member being movable through a predetermined distance for so moving said first member as to effect the movement of said leader a greater distance between said pressure-applying members and through said opening from said housing a sufficient distance to permit said leader to be grasped exteriorly of said housing for withdrawing said leader and said sheet therefrom, and means for holding said film unit within said housing so as to retain said sheet substantially stationary during said movement of said leader.

4. Photographic apparatus for use with a photographic film unit and for moving a sheet, comprising said film unit, within said apparatus and from said apparatus, said apparatus comprising, in combination, a housing for enclosing said film unit and positioning said sheet, a first opening in said housing for permitting the withdrawal of said sheet from said housing, means within said housing for engaging and moving a leader, associated with said sheet, relative to said sheet through said opening from said housing, a second opening in said housing, the last-mentioned means including an engagement member for contacting said leader within said housing, a second member projecting exteriorly of said housing through said second opening and movable toward said first opening for moving said engagement member toward said first opening in contact with said leader, and means coupled with said engagement member and said second member for so moving said engagement member as to effect the movement of said leader relative to said engagement member toward and through said first opening from said housing a sufficient distance to permit said leader to be grasped for withdrawing said sheet from said housing, means within said housing for supporting said leader in contact with said engagement member, and means for so holding said film unit within said housing as to retain said sheet substantially stationary during said movement of said leader through said first opening.

5. In photographic apparatus wherein a photosensitive sheet is adapted to be moved from one position to another by a leader projecting from said apparatus through an opening in said apparatus, means for advancing said leader from a position on a support surface within said apparatus through said opening from said apparatus, said means comprising an engagement member, means mounting said engagement member for rotation within said apparatus adjacent said support surface, for movement toward said support surface and for movement in engagement with a leader supported on said surface between a first position wherein said engagement member is predeterminedly spaced from said opening, and a second position less remote from said opening, actuating means coupled with said means for mounting said engagement member and being engageable exteriorly of said apparatus for moving said engagement member toward said support surface into contact with a leader supported thereon and for moving said engagement member in engagement with said leader from said first to said second position to effect the movement of said leader toward said opening, and means for rotating said engagement member during movement thereof from said first to said second position and advancing said leader relative to said engagement member toward said opening whereby said leader is moved relative to said opening a distance substantially greater than the distance between said first and second positions of said engagement member.

6. In photographic apparatus wherein a photosensitive sheet is adapted to be moved by a leader projecting from said apparatus through an opening in said apparatus, means providing a support surface within said apparatus for predeterminedly positioning said leader within said apparatus and for guiding said leader through said opening from said apparatus, an engagement member, means mounting said engagement member for rotation within said appartus adjacent said support surface for movement toward said support surface and for movement in engagement with a leader supported on said surface between a first position wherein said engagement member is predeterminedly spaced from said opening in said apparatus and a second position less remote from said opening, actuating means coupled with said means for mounting said engagement member and being engageable exteriorly of said apparatus for moving said engagement member toward said support surface into contact with a leader supported thereon and for moving said engagement member in engagement with said leader from said first to said second position to effect the movement of said leader toward said opening, and means for rotating said engagement member during movement thereof from said first to said second position and advancing said leader relative to said engagement member toward said opening whereby said leader is moved relative to said opening a distance substantially greater than the distance between said first and second positions of said engagement member.

7. The photographic apparatus of claim 6 wherein said means for rotating said engagement member includes resilient means deformed by movement of said engagement member from said first to said second position for returning said engagement member to said first position from said second position upon release of said actuating means.

8. The photographic apparatus of claim 6 wherein said means for mounting said engagement member comprises resilient means biased away from said support surface and being deformable toward said support surface by said actuating means for moving said engagement member toward said support surface.

9. The photographic apparatus of claim 6 wherein said means for mounting said engagement member comprises a support member slidably mounted within said apparatus on a wall thereof and a resilient member secured at one end to said support member, being pivotally mounted at the other end of said resilient member, said other end of said resilient member being biased toward said support surface, and said actuating means comprises a member secured to said resilient member and projecting exteriorly of said apparatus through an opening in said support member.

10. In photographic apparatus for exposing and thereafter processing the photosensitive element of a film unit by superposing said photosensitive element with another element and distributing a fluid processing composition between said elements, said apparatus including housing means for enclosing a film unit including a photosensitive element and a leader attached to said photosensitive element and positioned on a support surface within said housing, said housing including means for positioning said photosensitive element for exposure, means including an aperture in said housing for exposing said photosensitive element, an opening in said housing through which said film unit is movable and a pair of juxtaposed pressure-applying members within said housing adjacent said opening for engaging said film unit during movement thereof between said members through said opening and distributing a fluid processing composition between the photosensitive element and another element superposed therewith, the combination, in said apparatus, of an engagement roll, means mounting said engagement roll for rotation within said housing adjacent said support surface for movement toward said support surface and for movement in engagement with said leader supported on said surface between a first position wherein said engagement roll is predeterminedly spaced from said pressure-applying members and a second position less remote from said pressure-applying members, actuating means coupled with said means for mounting said engagement roll and being engageable exteriorly of said housing for moving said engagement roll toward said support surface into contact with a leader supported on said surface and for moving said engagement roll in engagement with said leader from said first to said second position to effect the movement of said leader toward and between said pressure-applying members, and means for rotating said engagement roll during movement thereof from said first to said second position for advancing said leader relative to said engagement roll toward said pressure-applying members whereby said leader is moved relative to said pressure-applying members a distance substantially greater than the distance between said first and second positions of said engagement roll.

11. Photographic appartus for exposing and processing photosensitive elements of film units positioned within said apparatus, said apparatus comprising, in combination, housing means for enclosing a film unit including a photosensitive element, a second element adapted to be superposed with said photosensitive element and a leader attached to said elements and for positioning said photosensitive element for exposure, an opening in said housing through which said film unit is movable, a pair of juxtaposed pressure-applying members within said housing adjacent said opening for engaging said film unit during movement thereof between said members through said opening and distributing a fluid processing composition between the photosensitive and second elements of said film unit, support means within said housing adjacent said pressure-applying members having a support surface for predeterminedly positioning said leader on the inside of said pressure-applying members and for guiding said leader between said pressure-applying members, engagement means mounted within said housing adjacent said support means for movement in engagement with a leader supported on said surface between a first position wherein said engagement means are predeterminedly spaced from said pressure-applying members and a second position less remote from said pressure-applying members, actuating means coupled with said engagement means projecting exteriorly of said housing and being engageable for moving said engagement means from said first to said second position in engagement with said leader for moving said leader toward and between said pressure-applying members, and means for rotating said engagement means during movement thereof from said first to said second position for advancing said leader relative to said engagement means toward said pressure-applying members whereby said leader is moved relative to said pressure-applying members a distance substantially greater than the distance between said first and second positions of said engagement means.

12. The photographic apparatus of claim 11 wherein said means for rotating said engagement means includes resilient means, deformed by movement of said engagement means from said first to said second position, for returning said engagement means to said first position from said second position upon release of said actuating means.

13. Photographic apparatus for exposing and thereafter processing a photosensitive element of a film unit by superposing said photosensitive element with a second element and distributing a layer of processing fluid between said elements, said apparatus comprising, in combination, housing means for enclosing a film unit including a photosensitive element and a leader attached to said photosensitive element, said housing means including means for positioning said photosensitive element for exposure, an opening in said housing through which said film unit is movable, a pair of juxtaposed pressure-applying members within said housing adjacent said opening for engaging said film unit during movement thereof between said members through said opening and distributing a fluid processing composition between said photosensitive element of said film unit and a second element superposed with said photosensitive element, means providing a support surface within said housing adjacent said pressure-applying members for predeterminedly positioning said leader on the inside of said pressure-applying members and for guiding said leader between said pressure-applying members, an engagement roll, means mounting said engagement roll for rotation within said housing adjacent said support means for movement toward said support means and for movement in engagement with said leader supported on said surface between a first position wherein said engagement roll is predeterminedly spaced from said pressure-applying members and a second position more closely adjacent said pressure-applying members, actuating means coupled with said means for mounting said engagement roll and being engageable exteriorly of said housing for moving said engagement roll toward said support surface into contact with said leader supported on said surface and for moving said engagement roll in engagement with said leader from said first to said second position to effect the movement of said leader toward and between said pressure-applying members, and means for rotating said engagement roll during movement thereof from said first to said second position for advancing said leader relative to said engagement roll toward said pressure-applying members whereby said leader is moved relative to said pressure-applying members a distance substantially greater than the distance between said first and second positions of said engagement roll.

14. Photographic apparatus for exposing and processing photosensitive elements of film units positioned within said apparatus, said apparatus comprising, in combination, housing means for enclosing a plurality of film units each including a photosensitive element, a second element adapted to be superposed with said photosensitive element and a leader attached to said elements, said housing means including means for positioning the photosensitive element of a film unit for exposure, an opening in said housing through which said film units are movable, a pair of juxtaposed pressure-applying members within said housing adjacent said opening for engaging said film units during movement thereof between said members through said opening and distributing a fluid processing composition between the photosensitive and second elements of said film units, means providing a support surface within said housing adjacent said pressure-applying members for predeterminedly positioning said leaders on the inside of said pressure-applying members and for guiding said leaders between said pressure-applying members, an engagement roll, means mounting said engagement roll for rotation within said housing adjacent said support means for movement toward said support means and for movement in engagement with a leader supported on said surface between a first position wherein said engagement roll is predeterminedly spaced from said pressure-applying members and a second position more closely adjacent said pressure-applying members, actuating means coupled with said means for mounting said engagement roll and being engageable exteriorly of said housing for moving said engagement roll toward said support surface into contact with a leader supported on said surface and for moving said engagement roll in engagement with said leader from said first to said second position to effect the movement of said leader toward and between said pressure-applying members, and means for rotating said engagement roll during movement thereof from said first to said second position for advancing said leader relative to said engagement roll toward said pressure-applying members whereby said leader is moved relative to said pressure-applying members a distance substantially greater than the distance between said first and second positions of said engagement roll.

15. The photographic apparatus of claim 14 wherein said means for rotating said engagement roll includes resilient means, deformed by movement of said engagement roll from said first to said second position, for returning said engagement roll to said first position from said second position upon release of said actuating means.

16. The photographic apparatus of claim 14 wherein said means for mounting said engagement roll comprise resilient means biased away from said support surface and being deformable toward said support surface by said actuating means for moving said engagement roll toward said support surface.

17. Photographic apparatus for exposing and processing photosensitive elements of film units positioned within said apparatus, said apparatus comprising, in combination, housing means comprising first and second sections movable with respect to one another and cooperating to provide a chamber for enclosing a plurality of film units, each film unit including a photosenstive element, a second element adapted to be superposed with said photosensitive element following exposure of the latter and a leader attached to said elements, means comprising said first housing section for locating said photosensitive elements in stacked relation with one of said photosensitive elements in position for exposure, an opening in said housing at an end of said chamber, a pair of juxtaposed pressure-applying members mounted within said housing adjacent said opening and providing a gap between said members through which said film units are movable substantially in a plane through said opening, means comprising said second housing section for positioning said second elements in stacked relation adjacent said photosensitive elements with the leader attached to each of said photosensitive elements disposed between said photosensitive elements and the second element comprising the same film unit as each said photosensitive element, said leaders projecting from between said photosensitive and second elements toward said pressure-applying members, means within said housing adjacent said pressure-applying members having a support surface for positioning portions of said leaders projecting from between said elements substantially in a plane through said gap between said pressure-applying members, an engagement roll, means mounting said engagement roll within said housing for rotation for movement toward said support surface and for movement in engagement with a leader supported on said support surface between a first position wherein said engagement roll is predeterminedly spaced from said pressure-applying members and a second position more closely adjacent said pressure-applying members, actuating means coupled with said means for mounting said engagement roll and being engageable exteriorly of said housing for moving said engagement roll toward said support surface into contact with a leader supported thereon and for moving said engagement roll, in engagement with the last-mentioned leader, from said first position to said second position for moving said last-mentioned leader between said pressure-applying members through said opening, and means for rotating said engagement roll during movement thereof from said first position to said second position for rotating said engagement roll and advancing said last-mentioned leader relative to said engagement roll toward said pressure-applying members whereby said last-mentioned leader is moved relative to said pressure-applying members a distance substantially greater than the distance between said first and second positions of said engagement roll.

18. The photographic apparatus of claim 17 wherein said means for rotating said engagement roll includes resilient means, deformed by movement of said engagement roll from said first to said second position, for returning said engagement roll to said first position from said second position upon release of said actuating means.

19. The photographic apparatus of claim 17 wherein said means for mounting said engagement roll comprise resilient means biased away from said support surface and being deformable toward said support surface by said actuating means for moving said engagement roll toward said support surface.

20. The photographic apparatus of claim 17 wherein said means for mounting said engagement roll comprise a support member slidably mounted within said housing on a wall thereof and a resilient member secured at one end to said support member and pivotally mounting said engagement roll at its other end, said other end of said resilient member being biased toward said support surface, and said actuating means comprises a member secured to said resilient member and projecting exteriorly of said housing through an opening in said support member.

21. Photographic apparatus for use with an assemblage of film units each comprising a photosensitive element, a second element and leader means coupled with said elements, said apparatus being adapted for exposing and thereafter processing said photosensitive elements during withdrawal of said film units from said apparatus, said apparatus comprising, in combination, housing means for enclosing and positioning said assemblage of film units with the photosensitive element of one of said film units in position for exposure and with portions of said leaders projecting from said assemblage and disposed against a support surface within said housing, engagement means for engaging the leader of said one film unit positioned on said support surface, said engagement means being mounted for movement toward said support surface and in engagement with a leader supported thereon toward an opening therein for advancing said leader through said opening from said apparatus, and means movably mounted within said housing adjacent said support surface and resiliently biased into the path of movement of said one film unit across said support surface for releasably engaging an edge of the second element of said one film unit and releasably retaining said second element against movement across said support surface during movement of said leader through said opening from said apparatus.

22. Photographic apparatus of the type wherein a photographic film unit including a sheet is moved within said apparatus and from said apparatus, said apparatus comprising, in combination, a housing for enclosing said film unit and positioning said sheet, an opening in said housing for permitting the withdrawal of said sheet from said housing, means within said housing for engaging and moving a leader relative to said sheet through said opening from said housing, said leader being a component of said film unit and being associated with said sheet for drawing said sheet from said housing, the last-mentioned means including an engagement member rotatable in engagement with said leader, means projecting exteriorly of said housing and movable toward said opening for moving said engagement member toward said opening in contact with said leader, and means for moving said engagement member toward said opening and for so rotating said engagement member during movement thereof toward said opening as to effect the movement of said leader relative to said engagement member toward and through said opening from said housing a sufficient distance to permit said leader to be grasped for withdrawing said sheet from said housing, means within said housing for supporting said leader relative to said engagement member, and means for so holding said film unit within said housing as to retain said sheet substantially stationary during said movement of said leader through said opening.

23. Photographic apparatus of the type wherein a photographic film unit including a sheet is moved within said apparatus and from said apparatus, said apparatus comprising, in combination, a housing for enclosing said film unit and positioning said sheet, an opening in said housing for permitting the withdrawal of said sheet from said housing, means within said housing for engaging and moving a leader relative to said sheet through said opening from said housing, said leader being a component of said film unit and being associated with said sheet for drawing said sheet from said housing, the last-mentioned means including an engagement member for contacting said leader, resilient means mounting said engagement member for rotation and for movement in the direction of said opening, and resilient means being biased away from said leader and being deformable toward said leader to permit said engagement member to contact said leader, means projecting exteriorly of said housing and movable toward said opening for moving said engagement member toward said opening in contact with said leader, and means for moving said engagement member in the direction of said opening for so rotating said engagement member during movement thereof in the direction of said opening as to effect the movement of said leader relative to said engagement member toward and through said opening from said housing a sufficient distance to permit said leader to be grasped for withdrawing said sheet from said housing, means within said housing for supporting said leader relative to said engagement member, and means for so holding said film unit within said housing as to retain said sheet substantially stationary during said movement of said leader through said opening.

References Cited in the file of this patent

UNITED STATES PATENTS

| | | |
|---|---|---|
| 1,081,770 | Pettibone | Dec. 16, 1913 |
| 1,792,295 | Gaseltine | Feb. 10, 1931 |
| 2,495,113 | Gannon | Jan. 17, 1950 |
| 2,609,296 | Land | Sept. 2, 1952 |